Jan. 22, 1963   M. DINOLFO ETAL   3,074,671
AIR DROPPED BUOY RELEASE MECHANISM
Filed April 21, 1961   2 Sheets-Sheet 1

Michael Dinolfo
Everett W. Farmer
INVENTORS

Robert O. Richardson
ATTORNEY

Jan. 22, 1963 M. DINOLFO ETAL 3,074,671
AIR DROPPED BUOY RELEASE MECHANISM
Filed April 21, 1961 2 Sheets-Sheet 2

Michael Dinolfo
Everett W. Farmer
INVENTORS
Robert O. Richardson
ATTORNEY

# United States Patent Office 3,074,671
Patented Jan. 22, 1963

3,074,671
AIR DROPPED BUOY RELEASE MECHANISM
Michael Dinolfo, Manchester, and Everett W. Farmer, Merrimack, N.H., assignors to Sanders Associates, Inc., Nashua, N.H., a corporation of Delaware
Filed Apr. 21, 1961, Ser. No. 104,568
11 Claims. (Cl. 244—138)

This invention relates to a one-way release mechanism capable of releasing by the operation of forces in one direction but which will not release under even greater forces in an opposite direction.

More particularly this invention relates to a release mechanism incorporated in a buoy which is to be dropped from an airplane and which upon impact with the water's surface allows the buoy's contents to be released.

A long standing problem in air dropped buoys, of the type here involved, has arisen when a parachute or other speed retarding means acts to decrease the speed of the buoy prior to its striking the water. The sudden retarding action of the parachute or other speed retarding device causes the buoy's internal mechanism to experience a sudden deceleration and the release mechanism upon which the internal mechanism rests, is faced with a sudden shock loading of great magnitudes. On the other hand, the release mechanism must release on impact with the water and the shock loading which causes the release mechanism to function is necessarily much smaller than the inertial deceleration shock loading experienced by the release mechanism when the parachute opens. It is, therefore, evident that air dropped buoys must have a release mechanism which can stand considerable shock forces in one direction without releasing while releasing quickly and cleanly when faced with a small force in the opposite direction.

The release mechanism comprising the present invention is located in the base portion of a cylindrical buoy and in one embodiment is comprised of a cast iron disc upon which there are a plurality of integrally formed tabs on the periphery of the disc which in turn fit in mating relationship with an equinumber of slots located in the cylinder walls of the buoy. Each of the tabs has formed thereon a raised bridge portion which has an intermediate portion of a reduced cross section. The tab has a transverse notched undersurface located directly beneath the bridge portion's intermediate reduced cross section. The internal contents of the buoy are supported on the disc. The cylindrical wall of the buoy is connected to a parachute which, when suddenly opened, exerts an upward force on the cylinder. This force is communicated to the tab ends and, cooperating with the force due to the sudden deceleration of the buoy's internal contents which rest on the disc, places the bridge portion of the tab in compression due to the cantilever bending action which appears in the tab portions. When the buoy strikes the water the impact force exerted to the underside of the disc causes the tabs to flex in a direction opposite to that above noted, placing the bridge portion in tension. Here, it is important to note that the disc is made of cast iron which has a compression strength to tensile strength ratio of 4:1. This fact coupled with the fact that cast iron does not follow Hookes Law and when placed in tension sufficient to fracture, as in the water impact situation, the cast iron tabs fracture and the internal contents of the buoy are permitted to pass out of the buoy's base and into the water.

In another embodiment of the invention, the above noted tab bridge portions are slotted at an intermediate point of the bridge and metal or epoxy resin inserts are placed in the slots, thereby enhancing the compressive qualities of the bridge while reducing the bridge's ability to withstand tensile loading.

In still another embodiment of the invention, a steel disc with peripheral tabs has the tabs forced into a locking cooperation with the cylinder slots when the parachute opens. When the buoy strikes the water, the slots are so formed as to cause the tabs to be cammed into a released position.

In yet another embodiment, the internal apparatus is supported above the disc via a resilient connection in order that the shock loading experienced by the disc when the parachute opens is delayed by the time it takes to compress the resilient connection, thereby preventing an instantaneous shock loading capable of fracturing the disc.

Therefore, an object of this invention is to provide a release mechanism which can stand severe loads in one direction while freely releasing upon application of a much smaller force in an opposite direction.

Another object of this invention is to utilize in a release mechanism the inherent property of cast iron of displaying a high compressive strength and a low tensile strength.

A still further object of this invention is to provide a release mechanism which is readily fabricated by a simple and inexpensive operation.

Another object is the provision of metal inserts in a cast iron release mechanism at a predetermined point of fracture to thereby enhance the compression strength of the release mechanism while simultaneously reducing the release mechanism's capacity to withstand tensile loading.

Another object is the provision of a reinforcing bridge on a cantilever support tab which upon loading the tab in one direction will place the bridge under compression, while loading in an opposite direction will place the cast iron tab bridge under tension, resulting in a fracture and permitting the mechanism to release.

Another object is the provision of a time delay means permitting a support to receive a shock loading greater than for which it was designed without failure by dissipating the shock loading received by the support over a period of time.

Another object is the provision of an air dropped buoy which is capable of withstanding rough handling during shipping without accidental release of the buoy's contents, yet perform its intended function of releasing upon water impact.

Other objects of my invention will in part be obvious and will in part appear hereafter.

The invention accordingly comprises the features of construction, combination of elements and arrangement of parts which will be exemplified in the construction hereinafter set forth and the scope of the invention will be indicated in the claims.

For a fuller understanding of the preferred embodiment of this invention, reference is now had to the drawings wherein.

Figure 1:
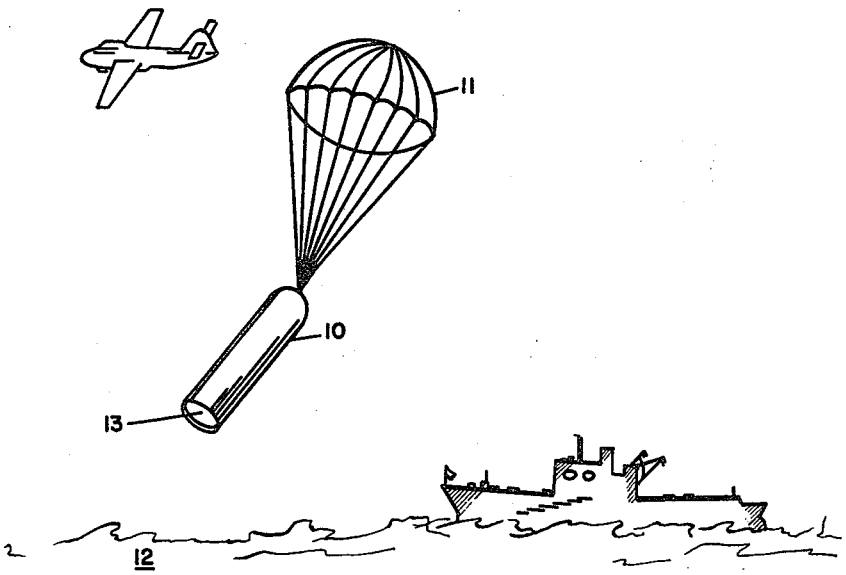
FIGURE 1, illustrates a buoy containing a release mechanism in mid-air flight.

Referring now to FIGURE 1, there is shown an air dropped buoy 10 being retarded in its downward flight by parachute 11. The entire apparatus, depicted in FIGURE 1, has been dropped from a plane flying above as shown. The buoy 10 will strike the water 12 in a vertical or nearly vertical position dependent upon the velocity at which the buoy was dropped from the plane and the wind at the surface of the water 12. A disc 13 located in the base of buoy 10 can be partially seen in FIGURE 1. This disc is designed to be released from the buoy 10 upon impact with the water to permit passage of the buoy's contents into the water.

Figure 2:
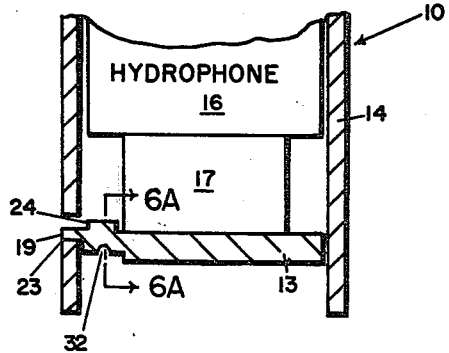
FIGURE 2, depicts a cross section of the buoy's base which contains the release mechanism.
Figure 3:
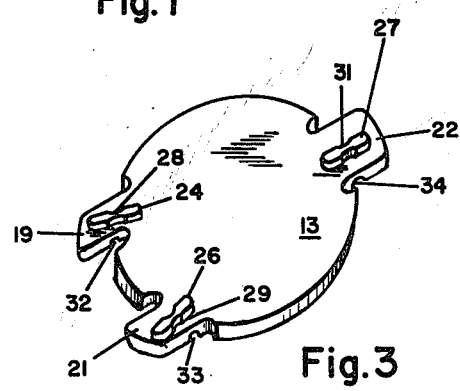
FIGURE 3, is a perspective view of the release disc which supports the buoy's internal apparatus.

Referring now to FIGURE 2 and FIGURE 3, there is seen in FIGURE 2 the base portion of the buoy 10, in a cutaway cross section. The base plate 13 shown in section in FIGURE 2 is best seen in FIGURE 3 where the entire base plate is depicted in a perspective view. A of the tabs 19, 21 and 22 have integrally formed thereon bridge members 24, 26 and 27. It will be noted that these bridge members have intermediate portions of reduced cross section 28, 29 and 31 respectively. As seen in both FIGURES 2 and 3, there are notched portions in the under surfaces of tabs 19, 21 and 22 which are designated as 32, 33 and 34.

It should be understood that the use of a bridge added to a plate as shown in these figures is esentially a means of increasing the strength of the section in one direction without appreciably effecting the strength in the opposite direction. When a tab such as 19, 21 or 22, depicted in FIGURE 3, is stressed as a cantilever beam in one direction the bridge is under compression. This is the strongest direction of the tab. When the tab and bridge are stressed in the opposite direction, the bridge is placed under tension and fails, since cast iron, the substance of which the plates 13 are made, does not follow Hookes Law.

It should be noted that Hookes Law states that, within the elastic limit, deformation produced is proportional to the stress. In view of the fact that cast iron inherently does not follow Hookes Law, there is little opportunity for the stresses that appear in the sections 28 and 32 in tab 19 for example, which are defined and depicted in FIGURE 6a, to be redistributed. Therefore, when the bridge is under tension, the stresses are comparatively high in its outer surface and once it starts to crack, i.e., fracture, the crack is propagated throughout the entire section and a resultant fracture cross section typical to that shown in FIGURE 6a results. A study of FIGURE 6a and the FIGURE 2 reveals that the section produced by the fracture of the tabs at the point of the bridge where notch 32 of the plate and reduced intermediate bridge section 28 are located has resulted because the above noted notch portions establish the weakest points of the disc.

Figure 4:
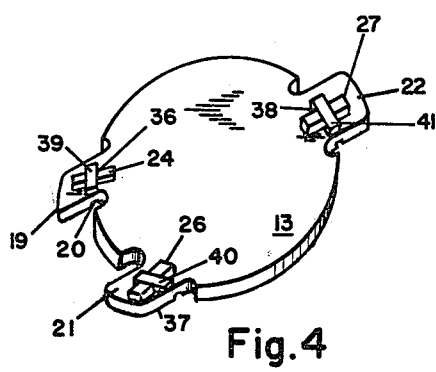
FIGURE 4 is a perspective view of another embodiment of the release disc which utilizes insertable support elements.

Referring now to FIGURE 4, there is seen a perspective view of another embodiment of a base plate of the type depicted in FIGURE 3. It will be noted that this base plate differs from that shown in FIGURE 3 in that the bridge members 24, 26 and 27 have transversely located slots 36, 37 and 38 therein, and fitted into these slots are pins or inserts 39, 40 and 41.

The purpose of these inserts is to enhance the bridge's capacity to withstand compressive loading of the bridge while simultaneously reducing the bridge and tab structures capacity to withstand tensile loading. It is readily seen that when the cantilever loading of the tab and bridge occurs the metal or epoxy resin inserts 39, 40, 41 are pinched or compressed due to the abutting pressure exerted by the bridge portions 24, 26, 27. On the other hand when tabs 19, 21, 22 are flexed in an opposite direction the inserts 39, 40, 41 can in no wise aid in sustaining the cantilever loading which would occur for example on water impact. Accordingly, the tab fails due to fracturing of the tab in the region of a transverse notch 20 which all of the tabs possess, thereby permitting the subsequent passage of the buoy's contents into the water.

Figure 5:
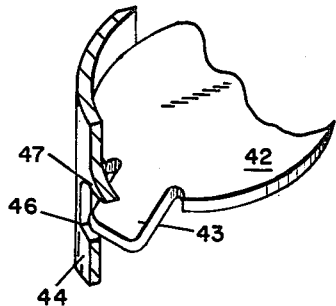
FIGURE 5 and FIGURE 5a, are perspective views of still another embodiment of the release disc and its cooperation with a portion of the buoy's cylindrical wall.
Figure 5A:
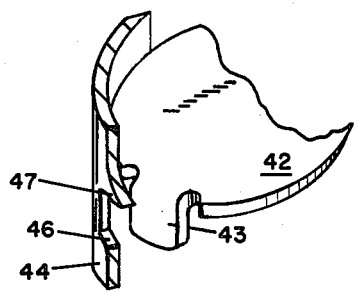

Referring now to FIGURE 5 and FIGURE 5a, there is here depicted another embodiment of the release plate. The plate here is constructed of sheet metal and is designated 42. At the periphery of the plate are a plurality of tabs one of which is shown as 43 and these tabs cooperate with slots in the cylinder 44 by having the downwardly extending tabs 43, which rest in an abutting relationship on the base of the slot 46 to thereby enable the plate 42 when loaded to support through the abutting supporting action of 43 and 46, the apparatus to be contained in the buoy. FIGURE 5a illustrates the plate 42 in a position just subsequent to water impact where the water force has pushed the plate and its cooperating tab 43 upwardly through the cylinder. An inwardly directed portion of the cylinder wall 47, cooperating with the surface of the tab 43 has acted to cam the tab member 43 inwardly in a radial direction of the cylinder 44 thereby forcing the tab into a position noted in FIGURE 5a wherein the base of tab 43 no longer abuts with the bottom of the slot 46.

The plate 42 no longer has a tab portion in an abutting supporting position which then permits the plate 42 and the buoy's contents to pass through the base of the buoy and into the water.

Figure 7:
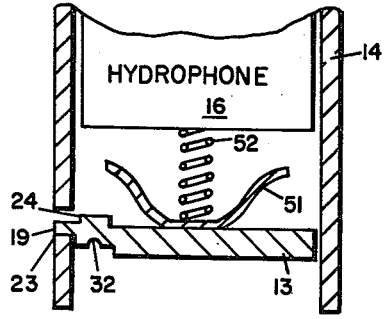
FIGURE 7, is a cross section of the buoy's base which contains the release disc and a resilient time delay support.

Referring now to FIGURE 7 wherein there is shown a cross section similar to that depicted in FIGURE 2. This figure discloses another embodiment utilizing the same release plate mechanism depicted in FIGURE 2, but goes one step further and has included between the hydrophone 16 to be passed through the base of the buoy and the plate 13 a resilient interconnection in the form of a coil spring 52. Interposed between the spring 52 and the plate 13 is a leaf spring 51 which acts as an additional limiting spring when there appears a sudden deceleration of the outer shell 14 which causes the hydrophone 16 to continue in the direction of plate 13. The spring 52 and leaf spring 51 cooperate to provide a time delay between the shock loading experience by the plate 13 when the buoy cylinder wall 14 is suddenly decelerated due to the opening of the parachute, as noted in FIGURE 1. The plate 13 of necessity and because of its construction can stand certain peak shock loadings. It is the function of springs 52 and 51 to delay though only momentarily the instantaneous shock loadings experienced by plate 13 when the above noted cylinder wall is caused to decelerate due to the parachute 11 opening.

The purpose of springs 51, 52 are to sequentially delay the total shock loading experienced by the plate 13. In other words, while the hydrophone 16 is depressing spring 52 with a force due to the weight of hydrophone 16 and its related deceleration, the base plate or disc 13 has transmitted to it a shock loading of a certain value which the disc 13 can absorb and dissipate. A moment later, and this moment is measured in milliseconds, the hydrophone 16 comes in contact with the leaf spring 51 and the resistive action of the spring acts to further aid in the deceleration of the hydrophone. This added deceleration produces a second shock force which is transmitted to the disc 13 which force is in turn absorbed by the disc 13. Another way to describe what occurs is to say that the spring arrangement depicted allows a shock loading experienced by disc 13 to be spread out over a period time thereby preventing an instantaneous shock loading capable of fracturing the disc 13.

Figure 8:
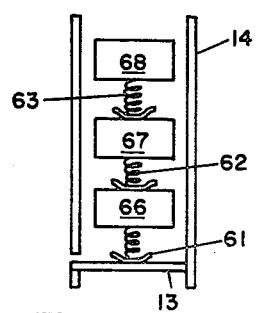
FIGURE 8, is a schematic embodiment illustrating a plurality of resilient time delay support elements.

Referring now to FIGURE 8 there is noted a further embodiment wherein a plurality of spring arrangements 61, 62, 63 are used to support masses 66, 67, and 68 respectively. In this embodiment the proper selection of spring constants permit the disc 13 to absorb over a period of time a total shock loading which results from the increased weight of units 67 and 68.

Figure 6A:
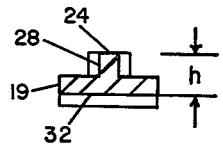
FIGURE 6a, is a section taken of a release tab as indicated in FIGURE 2.
Figure 6:
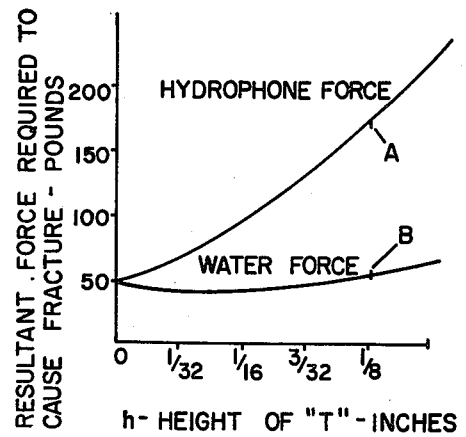
FIGURE 6, is a graph depicting the static fracture forces needed to cause release versus cross sectional tab bridge height of the embodiment of FIGURE 3.

By way of summary, reference is now made to FIGURE 6 wherein there is depicted graphically the truly remarkable capacity of the one-way release plates of the type illustrated in FIGURE 2 to FIGURE 4. This graph which has been plotted from data which shows that when the total height "h" of the bridge and tab section as illustrated in FIGURE 6a, is ⅛ of an inch the release disc is capable of withstanding an instrument load "A" of 175 pounds while a water impact force "B" of only 52 pounds will cause a fracture to occur and permit the release of the buoy's contents to the water.

While there have been described what are at present considered to be the preferred embodiments of this invention, it will be obvious to those skilled in the art that various changes and modifications may be made therein without departing from the invention, and it is, therefore, intended in the appended claims to cover all such changes and modifications as fall within the time spirit and scope of the invention.

What is claimed is:
1. An air dropped buoy comprising:
an elongated hollow body having wall portions and a central axis,
an inflight deceleration means connected to said wall portions,
said wall being disposed about said central axis, a release disc located in said hollow body transversely of said central axis,
said walls having a disc supporting means thereon,
said disc having thereon projecting tab portions integral with said disc,
said disc having an instrument unit supported thereon,
said support means and said tab portions having a connection in mating supporting relationship such that said connection can withstand inflight deceleration forces on said instrument unit without releasing said disc from said body, said connection permitting release of said disc and its supported instrument unit from said body when a lesser force, such as water impact force, is applied in an opposite direction to said disc, said release disc's tab portions are comprised of bridge support means integral with said tabs which act to reinforce said tab portions when said tab portions receive a cantilever loading in a direction which places said bridge portion in compression, while a loading in an opposite direction will place said tab bridge under tension resulting in a fracture and permitting said release disc supported instrument unit to be released.

2. A one-way release mechanism for:
an elongated hollow body having wall portions and a central axis,
said mechanism being subjected to a force applied in one direction and a lesser force applied in the opposite direction,
said release mechanism being operable to withstand the first force yet release under the lesser force,
said mechanism comprising,
a release disc located in said hollow body transversely of said central axis,
said walls having a disc supporting means thereon,
said disc having thereon projecting tab portions integral with said disc,
said support means and said tab portions having a connection in mating supporting relationship that said connection can withstand said force applied in one direction to said release disc along said central axis without releasing said disc from said body, said connection permitting release of said disc from said body when a lesser force is applied in an opposite direction to said disc.

3. The combination defined in claim 1 in which said release disc's bridge support means has an intermediate portion of reduced cross section to thereby enhance and insure the precise point of said bridge fracture when said tab experiences a load which places said bridge in tension.

4. The combination defined in claim 1 in which said bridge support means is comprised of a raised elongated bridge portion integral with said tab portion.

5. The combination defined in claim 1 in which said release disc's bridge support means is comprised of a raised elongated bridge portion having a transversely slotted bridge portion, an insert element located in said slot to thereby enhance the compression strength of said tab bridge portion while simultaneously reducing said tab bridge's capacity to withstand tensile loading, said slotted bridge and said insert cooperating to create a predetermined weakest point in said tab portion.

6. The combination defined in claim 1 in which said tab portions have a transversely notched under surface.

7. The combination defined in claim 1 in which said release disc is of cast iron construction.

8. The combination defined in claim 1 in which said release disc is of sheet metal construction and has downwardly projecting tab portions, said disc supporting means having a cam means connected thereto, said cam means abutting said downwardly projecting tab portions so that movement of said release disc causes said tab portions to be cammed into a position free of said support means.

9. The combination defined in claim 1 in which a time delay means interconnects said instrument unit and said release disc thereby permitting said release disc to receive a shock loading greater than for which it was designed without failure by dissipating the shock loading received by the disc over a period of time.

10. The combination defined in claim 1 in which said instrument unit is comprised of a plurality of instruments.

11. The combination defined in claim 10 in which a plurality of time delay means are interposed between and respectively connected to said plurality of instruments.

References Cited in the file of this patent
UNITED STATES PATENTS

| | | |
|---|---|---|
| 1,239,243 | Wuensch | Sept. 4, 1917 |
| 2,279,426 | Walsh | Apr. 14, 1942 |
| 2,395,252 | Carpenter | Feb. 19, 1946 |
| 2,629,083 | Mason et al. | Feb. 17, 1953 |